Patented Feb. 27, 1940

2,191,603

UNITED STATES PATENT OFFICE 2,191,603

FACTICE-CONTAINING PRINTING INK

Thomas C. Whitner, Jr., Elizabeth, N. J., assignor to Ellis Laboratories, Inc., a corporation of New Jersey No Drawing. Application December 27, 1937, Serial No. 182,013

4 Claims. (Cl. 134—35)

This invention relates to the preparation of printing inks and more specifically to those inks in which a factice is employed as the binding agent.

Printing inks consist for the most part of a liquid vehicle, a pigment, and a binding agent or binder. In one type of ink the liquid vehicle is a drying oil, such as linseed or perilla oil. Printings made with such compositions, however, are usually slow drying or setting, as the latter step is dependent upon oxidation of the oil film by contact with the atmosphere. To overcome this disadvantage another type of ink has been developed, i. e., quick-drying inks, in which the liquid vehicle consists entirely or in part of one or more non-aqueous, volatile liquids or those which rapidly evaporate at slightly elevated temperatures. Compositions of the latter type are applicable in both typographical and rotogravure work.

A variety of pigments, which may be classed chemically as inorganic or organic, may be incorporated into either type of printing ink. Carbon black is probably the best known pigment and most widely used, particularly in the compounding of black inks. Many natural and synthetic resins have been proposed as binding agents for the one or the other of the previously mentioned types of ink.

In addition to the above-named ingredients, many other substances may be incorporated as modifying agents for such properties of printing inks as body, tack and flowability. Examples of these agents are ethyl cellulose, paraffin wax, stearin pitch, glycerol, oil-soluble sulphonates, fatty acid soaps and the like. In addition, it may be desirable to include in the inks some type of drying agent, e. g., metallic naphthenates, as well as color-extending materials, such as magnesium carbonate.

In place of the resins previously mentioned, an oil-soluble factice, particularly the factice made from jojoba oil (which is obtained from the seeds or beans of *Simmondsia californica*), can be employed as the binding agent for printing inks. Such a factice possesses the advantage and distinguishing characteristic of being soluble in numerous liquids, particularly those employed in making either drying-oil or quick-drying printing inks. Although a small proportion of synthetic resin may be used in conjunction with jojoba oil or oil-soluble factice, nevertheless in the preferred form of my invention the factice alone is sufficient.

As an example of the preparation of an oil-soluble factice, I treat jojoba oil with sulphur chloride, preferably in the presence of a hydrocarbon solvent, e. g., benzol or low-boiling gasoline. After reaction is completed the solvent is removed from the product by evaporation or other convenient means. In this manner I obtain a light-yellow or amber-colored, highly viscous, adhesive-like mass. Preferably the quantity of sulphur chloride employed is 15–25 per cent by weight of the jojoba oil undergoing treatment. The product thus made can then be dissolved in the requisite proportion in the liquid serving as the printing ink vehicle. Other methods for making this factice have been described by Carleton Ellis in U. S. Patent 2,054,283, dated September 15, 1936.

In the case of quick-drying ink compositions comprising hydrocarbon solvents (e. g., benzol, xylol, kerosene fractions, and the like) which are substantially non-reactive with sulphur chloride, I may dissolve the jojoba oil in the liquid and then add just sufficient sulphur chloride to convert the oil into factice. In this manner I may obtain a solution of factice of any desired consistency or viscosity with which it is necessary only to incorporate those ingredients, such as pigment or modifying agents, to secure a printing ink. Should any undesirable quantity of acidic material result from interaction of jojoba oil and sulphur chloride, the same may be removed by washing the hydrocarbon solution with water or dilute aqueous alkali, or by refluxing the hydrocarbon solution and thus releasing any volatile acidic bodies, or in any other convenient manner.

Although, as mentioned above, the jojoba oil factice is viscous and sticky or adhesive-like, nevertheless it is observed that printing ink films (particularly from quick-drying inks) containing this material are not tacky or sticky thus causing paper sheets to tear or pull during printing operations or to effect sticking together of such printed sheets when piled on one another. On the other hand, such films are dry, non-smudging and flexible, i. e., paper on which printing has been done with inks containing jojoba oil factice may be rubbed without the ink smearing or may be creased without bringing about cracking of the oil film.

The following examples will illustrate my invention.

*Example 1.*—A black, drying-oil printing ink was prepared in which the proportions of ingredients were:

| | Parts |
|---|---|
| Oil-soluble synthetic resin (of cresolaldehyde type) | 5 |
| Boiled oiticica oil | 100 |
| Boiled perilla oil | 20 |
| Jojoba oil factice | 40 |
| Ceresin wax | 4.5 |
| Drier | 15 |
| "Solvesso" (boiling 420–540° F.) | 8 |
| Carbon black | 30 |
| Prussian blue | 10 |

The factice and resin were first dissolved in the mixed drying oils and then the ceresin wax. To the solution were added drier and "Solvesso". The latter may be defined as a liquid hydrocarbon solvent which contains a substantial proportion of aromatic compounds and is derived from petroleum. The drier consisted of a 33⅓ per cent solution of lead and cobalt naphthenate in heavy naphtha, naphthenates being present in the proportion of 1:4. Carbon black and Prussian blue were then incorporated into the mixture by grinding.

A thin film of this ink when dried on paper by exposure to the atmosphere for several hours possessed a hard surface and did not smudge. Furthermore, the inked paper could be creased without the ink film exhibiting signs of cracking.

*Example 2.*—Another black, drying-oil printing ink was made whose composition is represented by:

|  | Parts |
|---|---|
| Boiled linseed oil | 100 |
| Jojoba oil factice | 30 |
| Paraffin wax | 4 |
| Drier | 10 |
| Carbon black | 35 |

After dissolving factice and wax in the oil, drier was added, and then carbon black incorporated by grinding. The drier in this instance consisted of a 33⅓ per cent solution of cobalt naphthenate in toluene.

This ink exhibited properties similar to those shown by the product described in Example 1.

*Example 3.*—A red, drying-oil printing ink having the following composition was prepared:

|  | Parts |
|---|---|
| Shock-chilled tung oil | 75 |
| Boiled linseed oil | 55 |
| Jojoba oil factice | 35 |
| Calcium soap | 2 |
| Ceresin wax | 2 |
| Carnauba wax | 1 |
| Drier | 9 |
| Hydrated alumina | 20 |
| Red-colored pigment | 25 |

After dissolving factice, soap and waxes (in the order named) in the mixed oils, the drier was then added, and the pigment and extending agent (hydrated alumina) incorporated by grinding. The drier was a 33⅓ per cent solution of cobalt naphthenate in toluene.

This red ink also yielded solid, non-smudging, flexible films after being applied to paper and allowed to dry.

*Example 4.*—A quick-drying printing ink was compounded using the following ingredients:

|  | Parts |
|---|---|
| Jojoba oil factice | 35 |
| Heavy naphtha | 25 |
| Oil-soluble sulphonates | 7.5 |
| Paraffin wax | 1 |
| Carbon black | 21 |

The heavy naphtha was a refined petroleum distillate boiling between 300° and 400° F. In it were dissolved the factice, paraffin wax and oil-soluble sulphonates. The latter were derived from sulphuric acid-treated petroleum distillates. Carbon black was incorporated with the solution by grinding. The resulting ink had good flowing qualities and when applied as a thin film to paper it dried in 45–50 seconds at 145° C.

*Example 5.*—Another quick-drying printing ink possessed the following composition:

|  | Parts |
|---|---|
| Jojoba oil factice | 10 |
| Xylene | 26 |
| Ethyl cellulose | 2 |
| Paraffin wax | 1.4 |
| Carbon black | 7 |

This ink also had good flowing qualities and when applied as a thin film to paper dried in about 20 seconds at 150° C. At a somewhat lower temperature, 130° C., the drying time was approximately 25 seconds. In both instances the dried films were non-smudging and flexible.

*Example 6.*—An orange-colored quick-drying printing ink contained the following proportions of ingredients:

|  | Parts |
|---|---|
| Jojoba oil factice | 41.5 |
| "Solvesso" (boiling 365–420° F.) | 27.5 |
| Ceresin wax | 1.3 |
| Ethyl cellulose | 1.1 |
| Magnesium carbonate | 6 |
| Hydrated alumina | 19 |
| Orange-color pigment | 24.5 |

Factice, wax and ethyl cellulose were dissolved in "Solvesso", and with this solution were incorporated (by grinding) the orange-colored pigment and the extending agents, magnesium carbonate and hydrated alumina. The resulting composition possessed the requisite qualities of a good, quick-drying printing ink. A thin film of it spread on paper dried in 40–45 seconds at a temperature of 155° C.

As mentioned previously, jojoba oil factice is particularly applicable to the preparation of quick-drying inks because of its solubility in a wide variety of liquids, e. g., hydrocarbons (straight-chain or aromatic), chlorinated hydrocarbons, and certain oxygenated hydrocarbons such as esters or ketones, or mixtures of these various liquids. By quick-drying inks are meant those compositions which dry by evaporation of the liquid vehicle or a substantial proportion thereof, especially by the application of mild heating for a very short period of time. Jojoba oil factice may be employed also in the making of drying oil inks, i. e., those compositions in which the liquid vehicle is a drying oil, and setting or drying of the ink is accomplished by oxidation of the liquid vehicle. Incorporation of the factice, according to my invention, in either type of ink gives rise to non-tacky, non-smudging, flexible ink films.

Although jojoba oil factice has served to illustrate my invention, other oil-soluble factice made from the appropriate oil or wax may be employed in like manner. Furthermore, I do not wish to be limited to any specified proportion or proportions of oil-soluble factice. Wide variations in the quantity of factice (which is suitable for my purpose) enable me to secure corresponding changes in the tack, flowability, body and other properties of the ink over wide limits. The requisite amount of binding agent necessary, according to my invention, to obtain the desired qualities in a printing ink can be readily ascertained by experiment.

As pointed out previously, the ink compositions may contain not only oil-soluble factice as the binding agent, but also, if desired, a small proportion of a synthetic and/or natural resin. The latter should, of course, be miscible with the liquid vehicle and compatible with the factice. However, for my purpose the factice alone is sufficient in most instances. Furthermore, by the term soluble as used herein, I mean that a substantial proportion of the factice may be dissolved in the liquid vehicle or vehicles at hand and not merely a trace or very small proportion.

What I claim is:

1. A quick-drying printing ink composition, substantially free from drying oils, capable of yielding dried ink film when momentarily subjected to the action of heat, which comprises pigment material dispersed in a vehicle consisting of jojoba factice as the sole binding agent and a volatile liquid solvent therefor substantially devoid of drying oils, the proportion of said pigment being sufficient to render said film non-tacky and non-smudging.

2. A quick-drying printing ink composition, according to claim 1, in which the proportion of factice is greater than the proportion of volatile liquid solvent.

3. A quick-drying printing ink composition, according to claim 1, in which the proportion of factice is less than the proportion of volatile liquid solvent.

4. A quick-drying printing ink composition, substantially free of drying oils and capable of yielding dried ink film when momentarily subjected to the action of heat, which comprises pigment material dispersed in a vehicle consisting of jojoba factice as the sole binding agent and a volatile liquid hydrocarbon solvent therefor substantially devoid of drying oils, the proportion of said pigment being sufficient to render said film non-tacky and non-smudging.

THOMAS C. WHITNER, JR.